United States Patent [19]

Nussbaumer

[11] 3,946,999
[45] Mar. 30, 1976

[54] APPARATUS FOR PLASTICIZING AND INJECTING MOULDABLE SYNTHETIC MATERIAL

[75] Inventor: Thomas Nussbaumer, Zug, Switzerland

[73] Assignee: Patent and Inventions Ltd., Switzerland

[22] Filed: Dec. 30, 1974

[21] Appl. No.: 537,324

[30] Foreign Application Priority Data
Jan. 4, 1974 France .................................. 74.224

[52] U.S. Cl. .............................................. 259/191
[51] Int. Cl.² ........................................... B29B 1/06
[58] Field of Search ............ 259/191, 192, 193, 97, 259/9, 10, 5, 25, 26, 45, 46; 425/244, 245

[56] References Cited
UNITED STATES PATENTS

| | | | |
|---|---|---|---|
| 3,131,433 | 5/1964 | Volland | 259/191 |
| 3,156,013 | 11/1964 | Elphee | 259/191 |
| 3,822,057 | 7/1974 | Wheeler | 259/191 |
| 3,865,354 | 2/1975 | Burpulis | 259/191 |

Primary Examiner—Robert W. Jenkins
Attorney, Agent, or Firm—McGlew and Tuttle

[57] ABSTRACT

Apparatus for plasticizing and injecting mouldable synthetic material is disclosed. The apparatus comprises a cylindrical member having a longitudinal cylindrical bore therein into which such material is introducible, nozzle means firmly secured to one end portion of the cylindrical member and communicating with the cylindrical bore, a worm shaft mounted in the bore to be axially and rotatably displaceable relative to the cylindrical member and provided with an opening of circular cross-section extending longitudinally of the shaft from an end face thereof facing the nozzle means, and a closure body firmly secured to the cylindrical member and projecting into the opening, the closure body providing a seal between the opening and the longitudinal cylindrical bore. Advantageously, the apparatus is provided with valve means disposed at the end portion of the worm shaft which is next adjacent the nozzle means to restrain flow of such material along the cylindrical bore in a direction away from the nozzle means.

6 Claims, 1 Drawing Figure

U.S. Patent  March 30, 1976  3,946,999
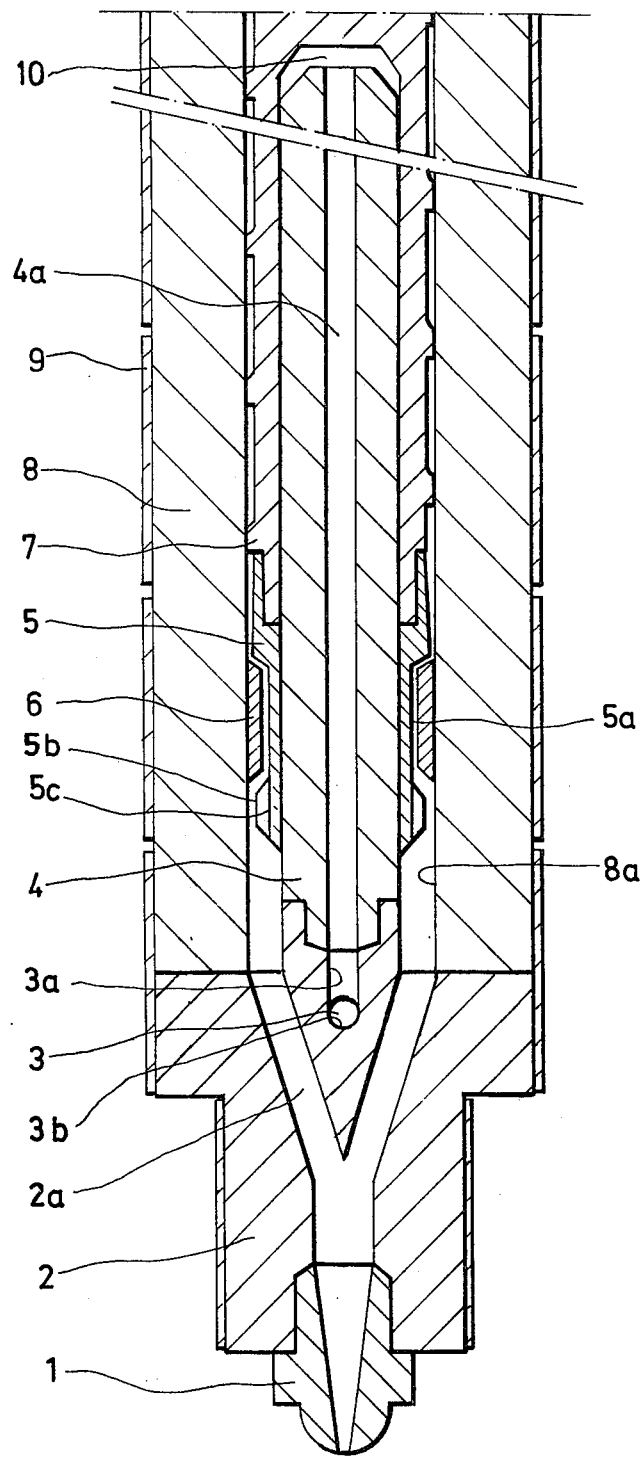

APPARATUS FOR PLASTICIZING AND INJECTING MOULDABLE SYNTHETIC MATERIAL

BACKGROUND OF THE INVENTION

The present invention relates to apparatus for plasticizing and injecting mouldable synthetic material.

Injection casting machines and injection presses for the manufacture of moulded parts of synthetic material generally comprise a hollow cylinder provided with a worm shaft, which is rotatably mounted in the bore of the cylinder and which makes possible the conveying the plasticizing of mouldable synthetic material. In many cases, the worm shaft is also axially displaceable and then serves simultaneously as a piston to press the synthetic material through a nozzle in the moulding tool.

Earlier, the time expended for the manufacture of a moulded part was largely determined by the time required for the cooling down of the moulded part. In more recent times, moulding tools have been improved in such a manner, that the cooling-down time became substantially shorter than was the case previously. This is the case particularly in the manufacture of thin-walled parts, such as for example containers, pots, lids and wrapping materials.

During the cooling-down time, different operating steps, particularly the plasticizing of the mouldable synthetic material, have been carried out. The shortening of the cooling down time is now such that the manufacturing time for thin-walled moulded parts is determined mainly by the expenditure of time required for the plasticizing the mouldable material.

The plasticizing performance of a press can be increased if the circumference of the worm shaft is enlarged. When the worm shaft is displaced in an axial direction towards the nozzle to press the mouldable material through the nozzle, the driving force required to axially displace the shaft is equal to the product of the cross-sectional area of the worm shaft and the pressure exerted on the mouldable material by the worm shaft. If the same pressure is to be attained with worm shafts of different diameters, the driving force in the case of the use of a worm shaft of larger diameter must thus be increased proportionally to the greater cross-sectional area of such an enlarged worm shaft.

This however poses a problem since the manufacturer of the injection casting machines and injection presses normally manufactures about three to four standard sizes of each type of machine, the drive motors of which are matched to the sizes of the worm shaft diameter. If the diameter of the worm shaft is now increased, then the performance of the motor serving for the generation of the pressure must be correspondingly increased. The employment of a stronger motor for the generation of the greater pressure would however make the machine appreciably more expensive and also render it considerably more bulky.

There is of course the possibility of employing a hydraulic pressure converter in place of a stronger motor. This solution is also however relatively expensive. Moreover, greater axial forces, which represent an increased loading of the machine elements, arise in the employment of a stronger motor as well as also in the employment of a pressure converter.

An object of the present invention is to provide an apparatus, which makes it possible to plasticize a greater quantity of mouldable synthetic material per unit time without the attainable pressure decreasing for that reason and without the driving equipment serving for the axial displacement of the worm shaft having to be changed significantly. Furthermore, the increase in plasticizing performance should also not materially increase the bulk and the cost of the machine.

SUMMARY OF THE INVENTION

According to the present invention there is provided apparatus for plasticizing and injecting mouldable synthetic material comprising a cylindrical member having an axial bore of circular cross-section therein into which such material is introducible, nozzle means firmly secured to one end portion of the cylindrical member and communicating with the cylindrical bore, a worm shaft mounted in the bore to be axially and rotatably displaceable relative to the cylindrical member and provided with an opening of circular cross-section extending longitudinally of the shaft from an end face thereof facing the nozzle means, and a closure body mounted to be stationary within the cylindrical member and to project into the opening, the closure body providing a seal between the opening and the axial bore.

BRIEF DESCRIPTION OF THE DRAWING

An embodiment of the present invention will now be more particularly described by way of example with reference to the single FIGURE of the accompanying drawing which shows a longitudinal section through an apparatus for plasticizing and injecting mouldable synthetic material. For convenience of illustration, the apparatus is illustrated in the drawing with the longitudinal axis of the apparatus vertical. In the injection casting machines and injection presses, apparatus in the form of the plasticizing device is generally however so arranged, that its longitudinal axis extends horizontally.

DESCRIPTION OF THE PREFERRED EMBODIMENT

Referring now to the drawing, the apparatus for plasticizing and injecting mouldable synthetic material is provided with nozzle means comprising a nozzle carrier member 2 and nozzle 1, which is attached to the nozzle carrier 2. The nozzle carrier 2 is provided with a plurality of passages 2a and is, in its turn, attached to a hollow cylindrical member 8, by means of screws (not shown). The hollow cylinder 8 is rigidly connected with the machine frame (not shown) of an injection casting machine or an injection press by any suitable attaching means (not shown). The hollow cylinder 8 is provided with collar-shaped heating elements 9, which are disposed around its external peripheral surface.

Arranged in the internal cylindrical bore 8a of the hollow cylinder 8 is a worm shaft 7, which is mounted to be rotatable and additionally displaceable in the axial direction of the cylinder 8. The worm shaft 7 is provided, at its end facing the nozzle 1, with a longitudinal blind bore 10, the diameter of which advantageously is at least equal to half the external diameter of the worm shaft 7.

A cylindrical closure body in the form of a plug 4, which is co-axial with the hollow cylinder 8, is secured to the nozzle carrier 2 and, in this manner, is firmly connected to the hollow cylinder 8 to be non-displaceable relative thereto. The plug 4 is provided with a penetrating longitudinal bore hole 4a.

As indicated above the nozzle carrier 2 is provided with several passages 2a and these passages connect the internal bore 8a of the hollow cylinder 8 with the extrusion opening of the nozzle 1. The nozzle carrier 2 is also provided with at least one further passage 3. The passage 3 comprises a longitudinally extending passage portion — formed by a blind bore 3a which extends from the centre of the inner end face of the nozzle carrier 2 — and a transversely extending passage portion 3b leading radially outward from the longitudinal passage portion 3a. The passage 3 thus connects the longitudinal bore 4a of the plug 4 and thereby also the longitudinal bore 10 of the worm shaft 7 with the external atmosphere.

The worm shaft 7 is provided at its end portion next adjacent the nozzle 1 with co-axial sleeve means. The sleeve means 5 may be screwed on to a threaded end portion of the worm shaft, or may be rigidly connected with the worm shaft in any other suitable manner. The sleeve means 5 is so dimensioned that the internal surface of the sleeve means 5 and the external surface of the hollow plug 4 together form a sliding seating, which seals the longitudinal bore 10 relative to the bore 8a. The length of the sleeve means 5 is so dimensioned that the sleeve means 5 is adequately seated on the external surface of the plug 4.

The external diameter of the sleeve means 5 is somewhat smaller than the internal diameter of the hollow cylinder 8, so that between the sleeve means 5 and the internal surface of the hollow cylinder, there is present a clear gap, through which mouldable material can flow. The sleeve means 5 is provided with a generally annularly shaped groove 5a in its external periphery. A sleeve rim 5b limits the axial extent of the groove 5a at the nozzle-sided end of the sleeve. The sleeve rim 5b is provided with longitudinal grooves 5c.

Further arranged in the hollow cylinder 8 is a radially inwardly extending ring means 6, the external peripheral surface of which bears against the internal surface of the hollow cylinder 8 and forms together with this a sealingly closing push-fit. The ring means 6 protrudes into the groove 5a and is so shaped, that it sealingly closes the connection between the worm shaft 7 and the nozzle 1, when the inclined end surface of the ring 6 bears against the correspondingly inclined end wall of the groove 5a remote from the nozzle 1. The ring means 6 thus forms the closure element of a non-return valve means formed by co-operating surface portions of the ring 6 and the sleeve 5. So that the ring means 6 can be inserted in the groove 5a, either the sleeve means 5 or the ring means 6 is composed of several parts.

The apparatus illustrated in the drawing forms, as already mentioned, a part of an injection casting machine or an injection press. The envelope of the hollow cylinder 8 is provided in the vicinity of its end remote from the nozzle 1 with a filling opening (not shown), through which mouldable material be processed, possibly in powder form, can be supplied. The machine is provided with an electro-mechanical or hydro-mechanical drive device (not shown), by which the worm shaft 7 can be set into rotation in such a manner that the mouldable material can be conveyed from the filling opening to the nozzle-sided end of the worm shaft. Furthermore, the machine is provided with a device to displace the worm shaft in the axial direction of the cylinder 8.

The operation of the apparatus will now be described as follows:—

During the first operating step, which is referred to as the metering phase, the nozzle 1 is closed, for example, by sprue plug not shown in the drawing. During the metering phase, mouldable material is supplied through the above-mentioned filling opening in the cylinder envelope and conveyed by the worm shaft 7 forwardly toward the nozzle. The mouldable material is heated during the conveying process by the heating elements 9, so that it is also plasticized during the conveying process. The plasticized mouldable material which is subjected to pressure then flows round the valve body 6, which is urged against the rim 5b, and collects in the cavity bounded by the external surface of the body 4 and the internal surface of the hollow cylinder 8. In that case, the worm shaft 7 and the elements 5 and 6 of the valve means are successively pushed rearwardly, that is to say away from the nozzle 1. When the quantity of the mouldable material required for the manufacture of a moulded part is plasticized, the rotation of the worm shaft is interrupted, perhaps by a limit switch (not shown). The length of the blind bore 10 must of course be so dimensioned, that the worm shaft 7 can be displaced sufficiently far rearwardly.

During the next operating step, which is referred to as the injection phase, the worm shaft 7 is acted upon by pressure at its rear end and displaced forwardly toward the nozzle 1. The annularly shaped closure element 6 of the valve 5 and 6 is in that case urged against the rear end surface of the groove 5a, so that the plasticized mouldable material can no longer flow back and is pressed through the passages 2a and the opening of the nozzle 1 into the moulding tool not shown.

Since the longitudinal opening 10 of the worm shaft is connected through the passage 4a and the passage 3 with the atmosphere, atmospheric pressure always prevails in the longitudinal opening 10 independently of the axial position of the worm shaft. The pressure exerted upon the mouldable material during the injection phase is — apart from the frictional losses — equal to the pressure force exerted upon the worm shaft divided by the cross-sectional area of the cavity bounded by the peripheral surface of the bore 8a in the cylinder 8 and the external surface of the plug 4.

It is possible to provide a worm shaft embodying the invention in place of a worm shaft of full cross-section in a standard injection casting machine. Its diameter can then be so chosen, that the plasticizing performance per hour can be increased by at least about 50%. In favourable cases, perhaps in the processing of polyolefines, the plasticizing performance can be increased to about three times the value attainable with a full, smaller shaft. With suitable dimensioning of the diameter of the longitudinal opening 10, the same pressure can be attained during the injection phase as with a thinner full shaft without the performance of the device effecting the axial displacement of the shaft having to be increased.

The employment of a worm shaft of larger diameter at most requires a somewhat larger torque of the drive device. With suitable construction of the worm groove, this increase can however be kept relatively small. Moreover, the driving device serving for the generation of the torque normally displays a certain reserve performance, so that all moulding masses coming into consideration can be plasticized.

It is of course possible to provide for each machine one set of worm shafts of different diamters. A larger or a smaller shaft can then be used always according to the composition and viscosity of the moulding mass. Furthermore, existing machines displaying a shaft with full cross-section can also subsequently with little effort be provided with a shaft displaying a longitudinal opening.

The apparatus can of course be modified in different respects. For example, it would perhaps be possible to provide the worm shaft with a penetrating longitudinal opening instead of with a blind hole. The bore hole 4a and the passage 3 could then be omitted.

Furthermore, the plug 4 could be connected directly and non-displaceably with the envelope of the hollow cylinder 8 instead of being connected thereto via the nozzle carrier 2.

With the afore described apparatus, not only thermoplastics but also hardenable synthetic materials or elastomers may be processed.

I claim:

1. Apparatus for plasticizing and injecting moldable synthetic material comprising, a cylindrical member having an axial bore of circular cross-section therein into which said material is introducible; nozzle means firmly secured to one end portion of said cylindrical member and communicting with said cylindrical bore; a worm shaft mouned in said bore to be axially and rotatably displaceable relative to said cylindrical member and provided with an opening of circular cross-section extending longitudinally of said shaft from an end face thereof facing said nozzle means; and a closure body mounted to be stationary within and relative to said cylindrical member and to project into the opening of said worm shaft, said closure body providing a seal between the opening of said worm shaft and said axial bore.

2. Apparatus as defined in claim 1, further comprising valve means provided at the end portion of said worm shaft next adjacent said nozzle means, said valve means being selectably operable to restrain flow of said material along said cylindrical bore in a direction away from said nozzle means.

3. Apparatus as defined in claim 1, further comprising sleeve means firmly secured to the end portion of said worm shaft next adjacent said nozzle means, the internal peripheral surface of said sleeve means being slidably seated on the peripheral surface of said closure body to provide a seal between said opening and said longitudinal cylindrical bore.

4. Apparatus as defined in claim 3, further comprising a ring member supported on the inner peripheral surface of said cylindrical member to extend into an annular groove in said sleeve means, said ring member and said sleeve means being mutually engageable to provide valve means selectably operable to restrain flow of said material along said cylindrical bore in a direction away from said nozzle means.

5. Apparatus as defined in claim 1, wherein said nozzle means comprises a nozzle carrier member and a nozzle firmly secured to said carrier member, said carrier member being firmly secured to one end portion of said cylindrical member, said closure body being firmly secured to said carrier member and said carrier member being provided with at least one passage therein to connect said axial bore with said nozzle.

6. Apparatus for plasticizing and injecting moldable synthetic material comprising, a cylindrical member having an axial bore of circular cross-section therein into which said material is introducible; nozzle means firmly secured to one end portion of said cylindrical member and communicating with said cylindrical bore; a worm shaft mounted in said bore to be axially and rotatably displaceable relative to said cylindrical member and provided with an opening of circular cross-section extending longitudinally as said shaft from an end face thereof facing said nozzle means; and a closure body mounted to be stationary within and relative to said cylindrical member and to project into the opening of said worm shaft, said closure body providing a seal between the opening of said worm shaft and said axial bore, said nozzle means comprising a nozzle carrier member and a nozzle firmly secured to said carrier member, said carrier member being firmly secured to one end portion of said cylindrical member, said closure body being firmly secured to said carrier member and said carrier member being provided with at least one passage therein to connect said axial bore with said nozzle, said opening being defined by a blind bore in said worm shaft, said closure body being provided with a longitudinally extending passage therein and said carrier member being provided with at least one further passage, said longitudinally extending passage and said at least one further passage providing communication between said opening and the atmosphere.

* * * * *